March 12, 1929.   C. SVEC   1,704,774
STOP SIGNAL DEVICE
Filed Nov. 28, 1924   2 Sheets-Sheet 1
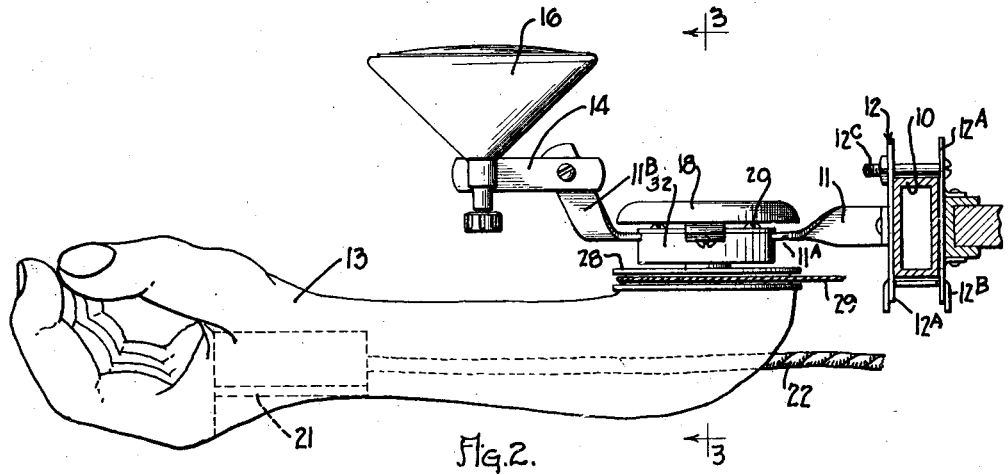
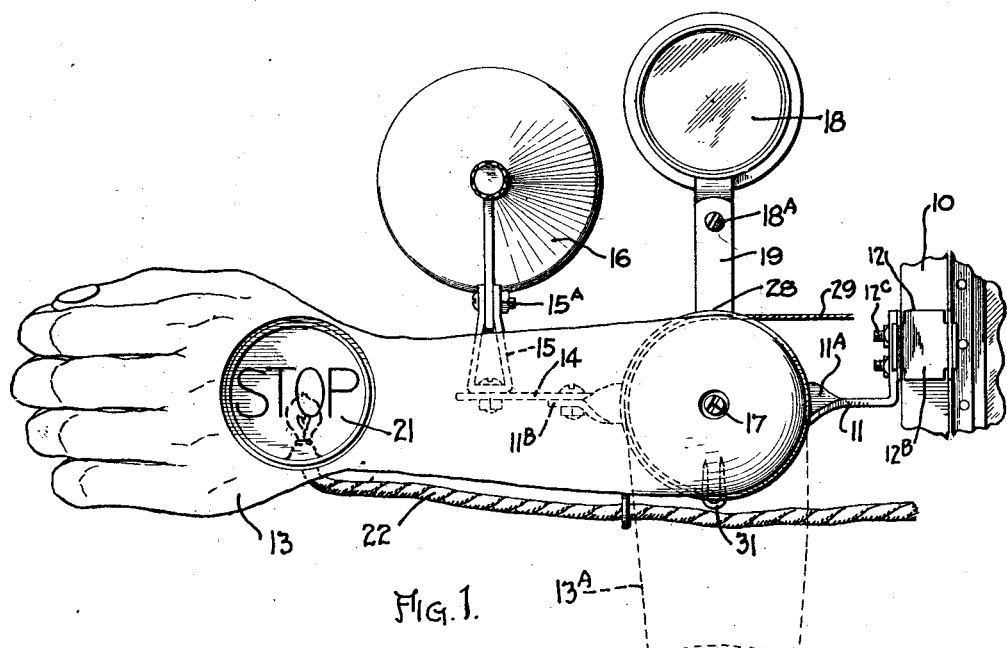

March 12, 1929.  C. SVEC  1,704,774
STOP SIGNAL DEVICE
Filed Nov. 28, 1924  2 Sheets-Sheet 2

INVENTOR
Charles Svec
BY Frank Schraeder Jr
Attorney.

Patented Mar. 12, 1929.

1,704,774

UNITED STATES PATENT OFFICE.

CHARLES SVEC, OF LA PORTE, INDIANA.

STOP-SIGNAL DEVICE.

Application filed November 28, 1924. Serial No. 752,503.

This invention relates to automobile stop signal devices and has among its objects the provision of a novel and useful warning signal which shall be comparatively low in cost of manufacture and efficient in operation.

Another object of the invention is to provide a novel bracket combining a support for the stop signal, electric lamp and rear vision mirror.

With these and other objects in view, my invention consists in the novel combination and construction of the parts and members shown in the accompanying drawings, described in the following specification and particularly pointed out in the appended claim.

Figure 3:
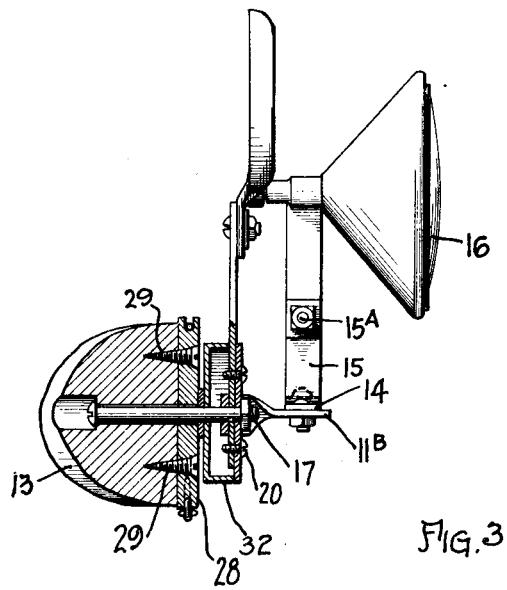
Figure 4:
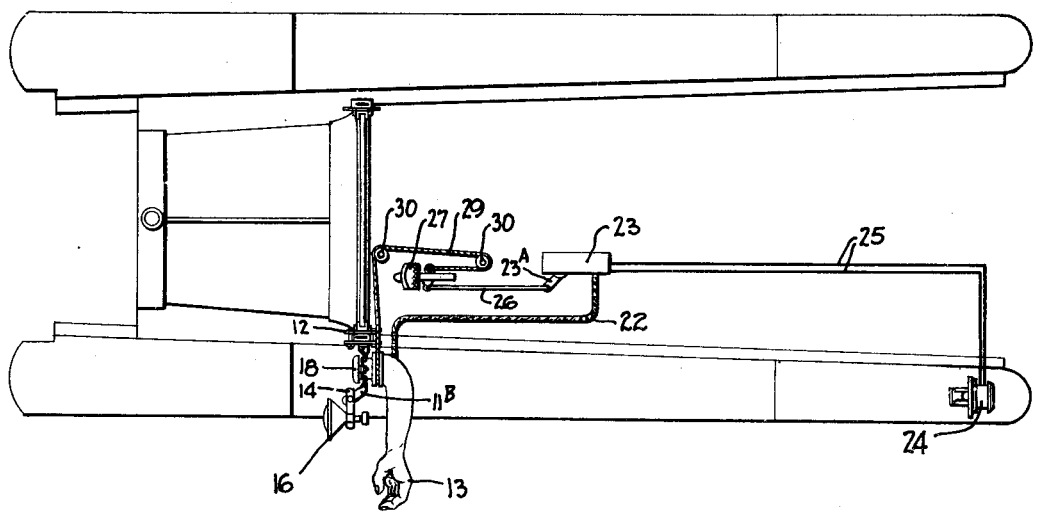

Referring to the drawings, in which like reference characters denote like or corresponding parts, Figure No. 1, is a side elevation of a stop signal and supporting bracket embodying my invention. Figure 2 is a plan view of same. Figure 3, is a cross section taken on line 3—3 of Figure 2, and Fig. 4, is a plan view of an automobile showing the operative connection of my signal with the foot brake lever and switch.

Referring to the illustrations, 10 indicates the frame work of the wind shield of the automobile, to which I preferably mount the bracket 11 by means of a clamp 12 comprising a pair of parallel plates 12$^A$ connected together by the pin 12$^B$ and tightening bolt 12$^C$.

The bracket 11, comprises a twisted flat bar having the central portion 11$^A$, thereof twisted to an angle 90° to afford a vertically disposed flat surface for connection for the circular hollow body 32, on which I support the movable stop signal 13.

The outer end 11$^B$ of the bracket 11 is angularly disposed to form a support for the pivot arm 14 to the outer end of which I pivotally mount the bracket 15. The bracket 15 pivotally supports on the pin 15$^A$ the electric lamp 16.

The stop signal arm 13 is loosely mounted about the pivotal bolt 17 which is supported in the body 12.

The rear vision mirror 18 is pivotally mounted at 18$^A$ to the vertically disposed bar 19 which is rigidly secured to the body 12 by screws 20 at the intersection of the pivotal bolt 17.

The stop signal 13 is preferably made in a form simulating a human arm, the back of the hand portion of which is provided with an electrically lighted warning "stop" signal, the electric lamp 21 of which is suitably connected by the conductor 22 with a switch 23 located below the floor of the vehicle. If desired, the same switch 23 may also be connected with an auxiliary stop signal light 24 by suitable conductors 25.

The switch 23 is provided with a switch arm 23$^A$ which arm is connected to the foot brake lever 27 by the connecting rod 26.

The stop signal arm 13 is provided at its pivotal end with a sheave 28 which is rigidly fixed to the arm by screws 29.

Normally the signal arm 13 hangs downwardly from its pivotal support in a position shown by dotted lines 13$^A$ and out of sight from the rear of the vehicle.

To afford the automatic raising of the arm 13, into "stop" position upon the movement of the foot brake lever 27, I extend a flexible connection from the foot brake lever which passes over the small sheaves 30 and the sheave 28 to the permanent staple connection 31. It is now apparent that the downward movement of the brake lever 27 will raise the stop signal arm 13 into horizontal position and simultaneously operate the switch 23 to light the electric lamp therein and also the auxiliary stop light 24.

I claim:

In a stop signal mounting, the combination of a bracket adapted to support a pivotally supported stop signal, and comprising a laterally extending bar, means for removably mounting one end of said bar to the body of a vehicle, a supporting body rigidly mounted on said bar and intermediate its ends, said supporting body comprising an annular cup-like body having a recess therein and a cover plate therefor, a pivot bolt extending through said cover plate, and a sheave rotatably mounted on said bolt, said sheave adapted to support a stop signal arm.

In witness whereof I affix my signature.

CHARLES SVEC.